United States Patent
Fenyves et al.

(10) Patent No.: US 6,742,752 B1
(45) Date of Patent: Jun. 1, 2004

(54) PALLET JACK STOP

(76) Inventors: Marvin Fenyves, 101 Pullman St., Livermore, CA (US) 94551; Gordon Mosby, 122 Manzanita La., Tracy, CA (US) 95376

( * ) Notice: Subject to any disclaimer, the term of this patent is extended or adjusted under 35 U.S.C. 154(b) by 0 days.

(21) Appl. No.: 10/350,220

(22) Filed: Jan. 24, 2003

(51) Int. Cl.⁷ .................. A47B 91/00; A47G 29/00; A65D 19/00
(52) U.S. Cl. .................. 248/346.02; 248/346.01; 248/346.06; 108/55.3
(58) Field of Search .................. 248/346.02, 346.03, 248/346.06, 346.01, 903; 108/55.3; 220/1.5

(56) References Cited

U.S. PATENT DOCUMENTS

| | | | |
|---|---|---|---|
| 1,448,250 A | * 3/1923 | Au-Miller | 254/88 |
| 2,924,427 A | * 2/1960 | Larson | 254/88 |
| 3,391,760 A | 7/1968 | Gonser | |
| 3,878,064 A | * 4/1975 | Weisstuch et al. | 205/777 |
| 5,210,903 A | 5/1993 | Horning | |
| 5,332,066 A | 7/1994 | Pickeral | |
| RE34,889 E | * 4/1995 | Fogarty et al. | 14/69.5 |
| 5,580,022 A | * 12/1996 | Bach et al. | 245/346.01 |
| D385,080 S | * 10/1997 | Schueneman et al. | D34/38 |
| D389,796 S | 1/1998 | Olson | |
| 5,839,863 A | 11/1998 | Johansson | |
| D420,277 S | * 2/2000 | Burke et al. | D8/380 |
| D444,441 S | 7/2001 | Bennett, Jr. | |
| 6,349,656 B1 | * 2/2002 | Mitchell | 108/57.13 |
| 6,386,331 B2 | 5/2002 | Scheffer | |
| 6,418,691 B1 | * 7/2002 | Stroppiana | 52/480 |
| 6,520,344 B2 | * 2/2003 | Graham | 211/20 |
| RE38,076 E | * 4/2003 | Brennan, Jr. et al. | 108/53.1 |
| RE38,118 E | * 5/2003 | Townsend | 347/518 |
| D478,226 S | * 8/2003 | Peyker | D6/467 |
| 2001/0050034 A1 | 12/2001 | Gross | |

FOREIGN PATENT DOCUMENTS

| | | |
|---|---|---|
| FR | 2 584 664 | 6/1987 |
| JP | 9-66817 | 3/1997 |

* cited by examiner

*Primary Examiner*—Ramon O. Ramirez
*Assistant Examiner*—Amy J. Sterling
(74) *Attorney, Agent, or Firm*—Richard C. Litman

(57) ABSTRACT

The pallet jack stop is a rectangular, durable, portable, molded, rubber wheel cradle for restraining the movement of the pivot wheel(s) of a warehouse style pallet jack. One side of the cradle is beveled or ramped. The bottom of the ramped side contains a plurality of grooves, and the perimeter of the bottom of the remaining three sides is grooved in such a manner as to cause the device to grip the supporting surface when loaded. The opposite side of the cradle has a handle that is integrally constructed with the body of the device. The cradle's construction meets all safety and environmental requirements and is structurally stable for heavy cyclic loading under a wide range of environmental conditions.

11 Claims, 3 Drawing Sheets

PALLET JACK STOP

BACKGROUND OF THE INVENTION

1. Field of the Invention

The present invention relates to wheel-based warehouse style pallet jacks, and particularly to a portable material handling equipment or pallet jack stop formed by a wheel cradle with a small ramped approach on one side, and slots or ridges on the bottom. The device secures the main pivoting wheel of the pallet jack, thus preventing it from rolling around uncontrollably, endangering personnel and property.

2. Description of the Related Art

When storing or transporting goods in bulk quantities, it often becomes necessary to place such goods on pallets in order protect them from damage and facilitate their movement. These pallets are usually made of wood and elevate the bulk materials several inches above the warehouse floor, freight train car, or truck bed. These pallets, in turn, can be lifted and moved by warehouse personnel or other material handlers using devices known as pallet jacks. These pallet jacks resemble hand operated forklifts, in that they possess two or more heavy metal horizontal tines with metal rollers on their bottom side. These tines are usually connected at one end by a heavy metal bracket that houses a hydraulic pump connected to a vertical metal stanchion with hand controls on its upper end, and a supporting pivot wheel at its bottom.

The operator of the pallet jack moves materials by inserting the tines of the pallet jack in the open spaces created by the pallets beneath the materials. The operator then "jacks" the pallets with their materials above the supporting surface and then, primarily using the supporting pivot wheel, moves the palletized materials to their new location. The sturdy metal structure and powerful hydraulic pump of the pallet jack will allow one person to quickly move hundreds of pounds of materials, thus greatly reducing the need for extra warehouse personnel and freight terminal loading and unloading crews. These metal structures and pump mechanisms may cause the pallet jack to weigh several hundred pounds, even when unloaded. Whether unloaded or loaded, the heavy metal pallet jacks tend to move along their bottom rollers and pivot wheels if the surface where the jack was placed becomes unstable, as in the back of a freight car or cargo carrying vehicle. The same results may occur if the jack is stored in an area with a sloping surface. If adequate precautions are not taken to restrain the movement of an unused pallet jack, its uncontrolled movements may cause extensive property damage. These uncontrolled movements of the pallet jacks could also seriously injure warehouse workers and other personnel. One way to restrict the movement of an unused pallet jack is to elevate and restrict the movement of its pivot wheel. Elevating the pivot wheel, immobilizes the rollers on the bottom the of the pallet jack's tines. Restricting the movement of the pivot wheel at the structural base of the jack generally immobilizes the entire device, even when the supporting surface is unstable or sloping.

The problem of restricting the movement of heavy items with roller, wheeled feet or bases is not limited to the problem of pallet jacks. Larger pieces of home furnishings, (i.e. pianos, beds, sofas, etc.) automobiles and motorcycles present very similar problems to warehouse persons and freight carriers. Solutions have been devised to similarly restrict the movement of these wheeled devices utilizing pieces of equipment with long, heavy, sloping ramps having wheel cradles of various depths and at various elevations. The problem with devices having long heavy ramps is that often their size and weight can create additional material handling difficulties. Wheel cradles of various depths will often adequately restrain the wheel(s) of a heavy item to prevent rolling, but may not adequately address the problem of resistance to the sliding movement of a fixed wheeled support.

A number of devices have been proposed for restraining the movement of pallet jacks or similar heavy wheeled items.

U.S. Pat. No. 5,839,863, issued Nov. 24, 1998 to L. Johansson, describes a parking device for immobilizing a hand truck on the floor of a truck or cargo-hauling vehicle during vehicle movement. The device includes a two-part frame, the first of which is longer and thicker than the other part and is ramped on one side in order to facilitate the rolling of a hand truck into the parking device. The second part of this device is a rectangular cradle or cavity for restraining the wheels of the hand truck. The bottom of the device is either coated with a material having a high coefficient of friction, or has feet coated with a similar material to prevent slipping relative to the floor of the cargo-carrying vehicle. U.S. Pat. No. 3,391,760, issued Aug. 8, 1966 to H. A. Gonser, discloses a similar device in which a sturdy sheet steel wheel lock block is used to restrain the movement of the wheel of an automobile. This sheet steel device is formed generally into the shape of a rectangle with beveled sides that allow the wheel of the automobile to be rolled up and then down into the interior restraining space.

U.S. Des. Pat. No. 389,796, issued Jan. 27, 1998 to D. G. Olson, shows a long shallow ramped platform and elevated rectangular wheel restraint for a pallet jack's pivot wheel. A roped handle is also shown as part of this invention. U.S. Des. Pat. No. 444,441 shows a wheel chock configured as a disk with a sloped or ramped perimeter that rises to a certain height and then slopes downward to an interior space that would serve to restrain the wheel of a vehicle or other wheeled device. U.S. Patent Application Publication No. US 2001/0050034, published Dec. 13, 2001, shows an elevated rectangular metal skid assembly for restraining the movement of wheeled vehicles during transportation. U.S. Pat. No. 1,480,758, issued on Jan. 15, 1924 to W. T. Hight, describes a caster cup for restraining the movement of heavy furnitures items by slightly elevating and restraining their wheeled feet in a circular or polygonal block of wood, thick glass or porcelain.

Other patents showing devices for restraining the movement of heavy wheeled devices or furnishings by restricting the movement of their supporting wheels include U.S. Pat. No. 2,687,538, issued Aug. 31, 1954 to P. A. Marzillier (elevated wheeled bed leg interlock with fixed base); U.S. Pat. No. 2,699,628, issued Jan. 18, 1955 to B. Auer (a furniture caster cup made of moldable material for receiving the legs of heavy furnishings); U.S. Pat. No. 2,870,872, issued Jan. 27, 1959 to G. G. Rapp (a non-skid moldable automobile wheel chock block with metal side frames); U.S. Pat. No. 4,911,270, issued Mar. 27, 1990 to T. S. Hudson (a rigid chock for preventing the rolling movement of a vehicle wheel); U.S. Pat. No. 5,046,587, issued Sep. 10, 1991 to D. C. Jones (a trailer tongue wheel chock and support); U.S. Pat. No. 5,210,903, issued May 18, 1993 to J. L. Horning (furniture caster stop and process of immobilizing a caster); U.S. Pat. No. 5,332,066, issued Jul. 26, 1994 to G. R. Pickeral (boat trailer rest for restraining the trailer wheel); and U.S. Pat. No. 6,386,331, issued May 14, 2002 to R. L. Scheffer (method and apparatus for securing a shopping cart).

None of the above inventions and patents, taken either singly or in combination, is seen to describe the instant invention as claimed. Thus a pallet jack stop solving the aforementioned problems is desired.

SUMMARY OF THE INVENTION

The pallet jack stop is a compact, portable, sturdy cradle for restricting the movement of the pivot wheel(s) of a warehouse style pallet jack, thus restricting the movement of the pallet jack itself when not in use. The cradle is generally rectangular in shape, having a closed bottom with a short sloping ramp or bevel on one side and a rectangular carrying handle on the opposite side. The bottom side has a ridge around its outer edges and deep grooves underneath the ramped side. The cradle is made of a molded or extruded dense rubber, or other suitable sturdy resilient material.

The pallet jack is sturdy, easily portable and compact. It can easily be carried and used with one hand by adults who are physically fit enough to engage in warehouse and freight handling work. When not needed, the pallet jack stop can be quickly stored out of the way of warehouse traffic, safely placed on top of palletized materials or placed on a hook or holder provided on the pallet jack. The pallet jack stop is made of material of sufficient strength and elasticity as to allow it to repeatedly bear the weight of standard unloaded and loaded pallet jacks under the entire range of environmental conditions found in warehouses and cargo carriers, to include standard allowances for impact loading with safety factors. The pallet jack stop is made of materials that comply with the normally accepted criteria for combustibility, smoke generation and environmental protection.

Accordingly, it is a principal object of the invention to provide a pallet jack stop for immobilizing the pivot wheel of a pallet jack, so that a loaded or unloaded pallet jack will not move when the device is used on a sloped or moving surface.

It is another object of the invention to provide a portable pallet jack stop that is compact and light enough to be deployed by one adult who is physically fit for warehouse or freight handling work using one hand.

It is a further object of the invention to provide a pallet jack stop that does not need to be set up and can be easily carried or stored when not in use.

Still another object of the invention is to provide a pallet jack stop that is made of an environmentally safe dense rubber or similar material that has the strength, durability, elasticity and safety of composition to allow it to be subject to heavy cyclic loading, including impact loading under a wide range of environmental conditions.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
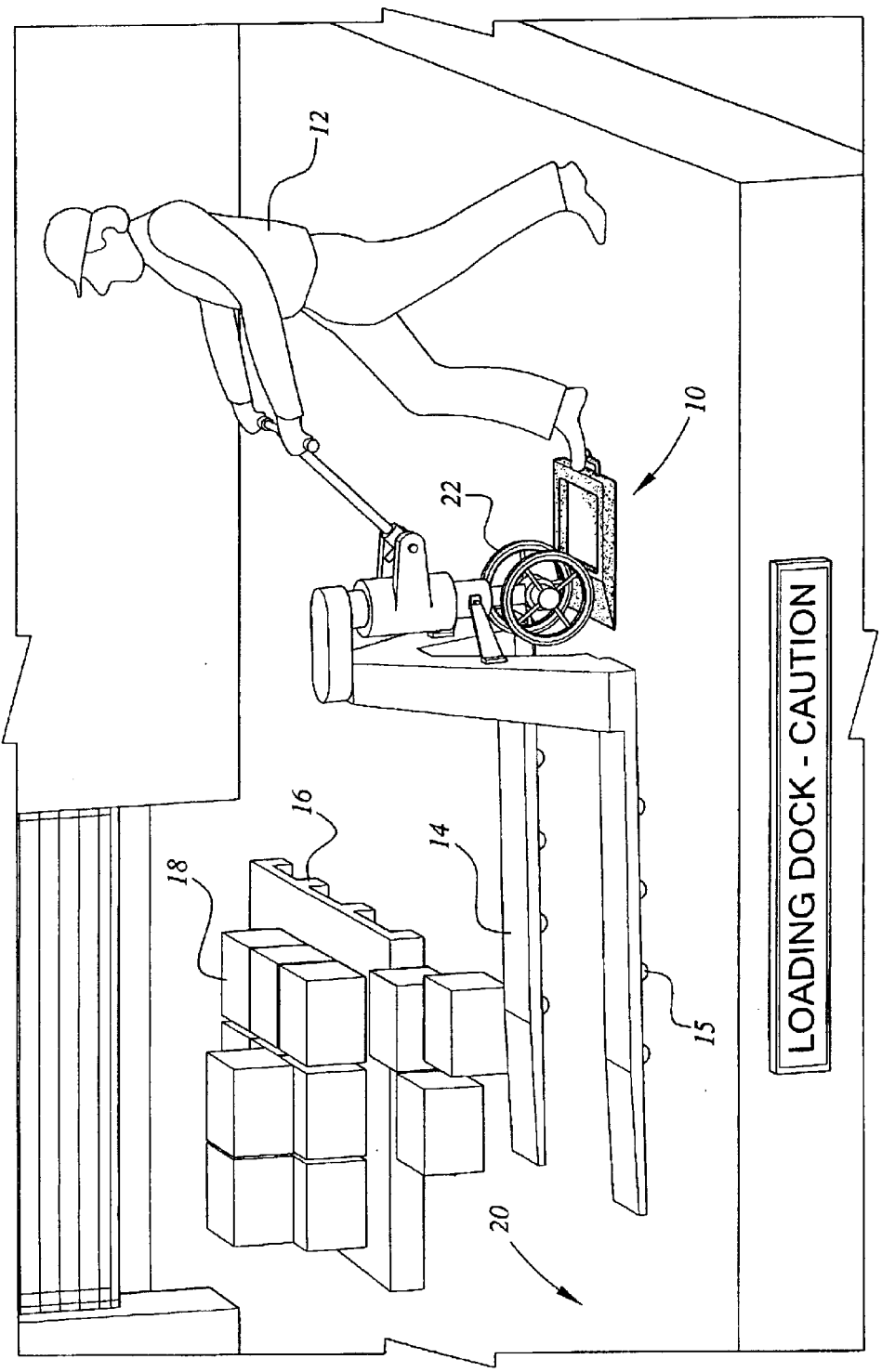
FIG. 1 is an environmental, perspective view of a pallet jack stop according to the present invention.
Figure 2:
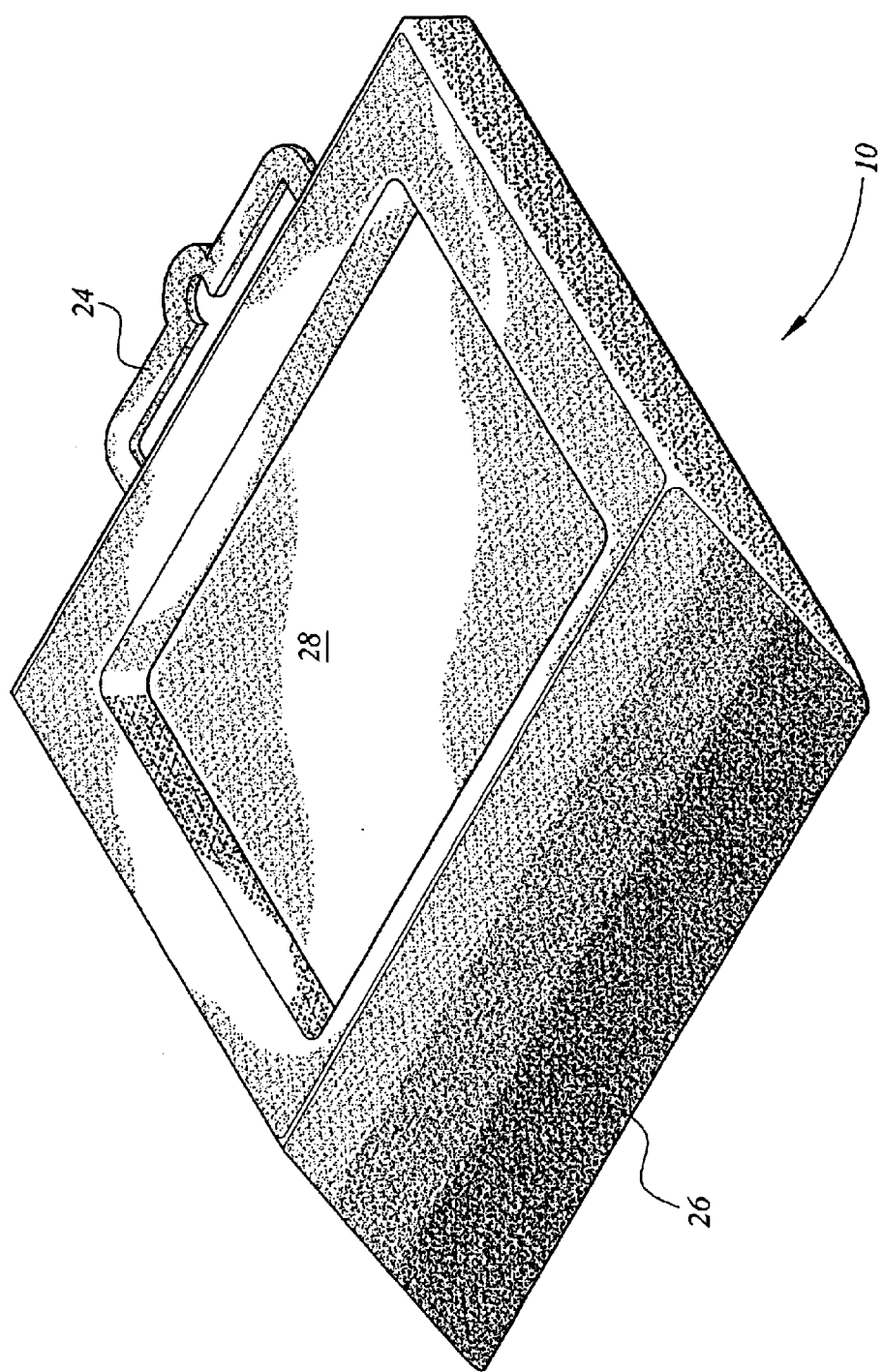
FIG. 2 is a top perspective view of the pallet jack stop.
Figure 3:
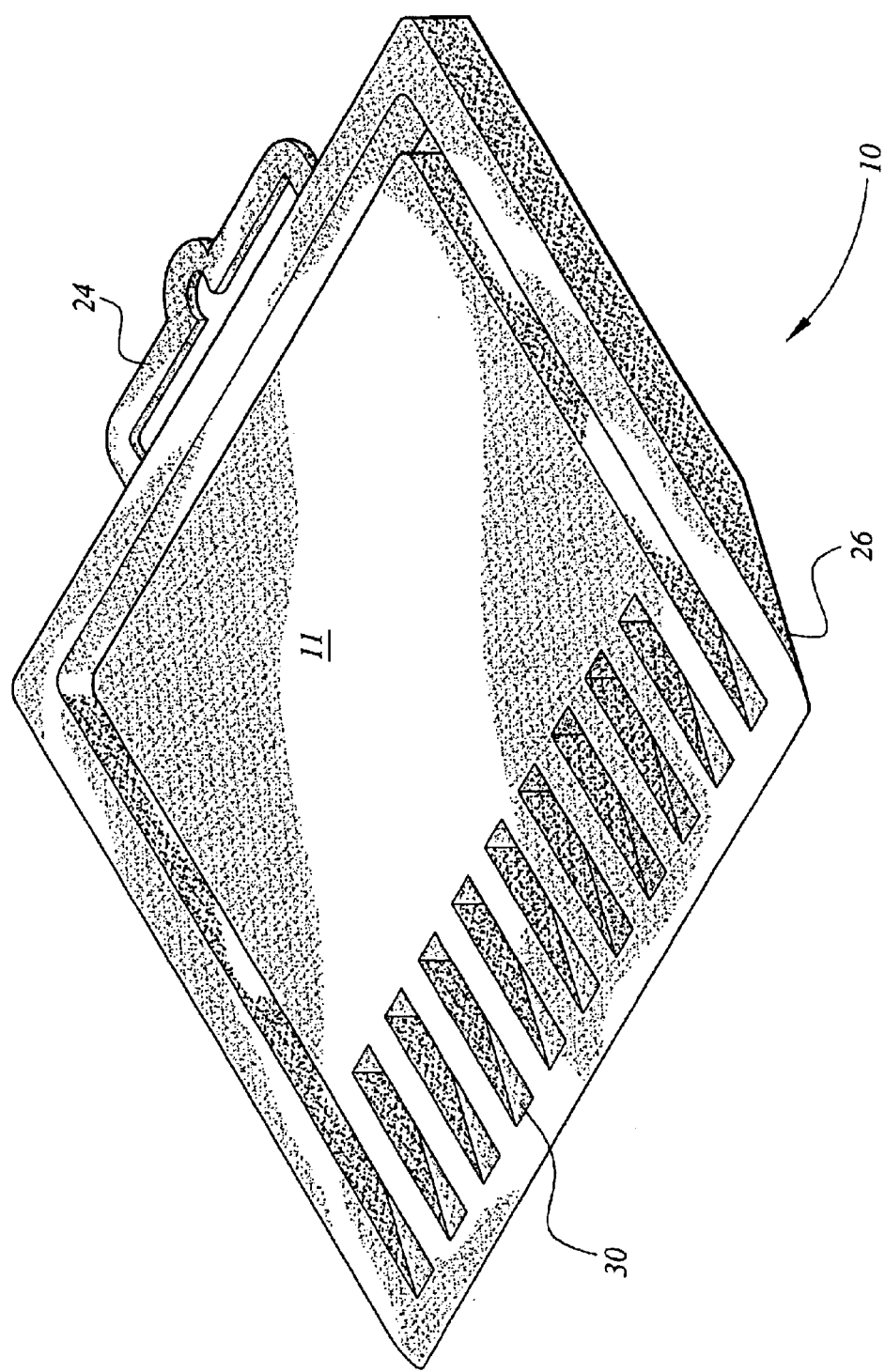
FIG. 3 is a bottom perspective view of the pallet jack stop.

The present invention is a pallet jack stop, designated generally as 10 in the drawings. The pallet jack stop 10 is designed to immobilize the pivot wheel(s) on a warehouse style pallet jack 14, as shown in FIG. 1. Referring first to FIGS. 2 and 3, the pallet jack stop is a rectangular wheel cradle 28 made from dense rubber (natural or synthetic) or similar material having a sloped end 26 and a handle 24 at the end opposite the sloped end 26. The pallet jack stop is preferably made in one piece by extrusion, molding or injection molding, with the cradle 28 being defined by a rectangular recess having four side walls and a bottom wall 11. Alternatively, the handle 24 may be made as a separate piece and joined to the body of the pallet jack stop 10 by adhesives, ultrasonic welding, heat welding, or other joinery techniques conventionally known in the art. The bottom side of the sloped side of the invention 26 has a series of rectangular slots 30 that are open to the bottom. These slots 30 may vary in their precise size, number and location as long as they are located beneath the ramped or beveled end 26 of the device 10. The slots 30 define cups which trap air against the floor 20, hereby providing traction for the ramp, while the ribs which define the slots 30 provide support for the surface of the ramp 26 in order to prevent the ramp from collapsing when the pallet jack 14 is wheeled up the ramp, as described below. It will also be noted that, as shown in FIG. 3, a groove is defined between the sidewalls of the cradle 28 and the outer walls of the pallet jack stop 10 on the three sides opposite the ramp 26, which also helps to provide traction for the pallet jack stop 10.

As shown in FIG. 1, the warehouseperson 12, having just unloaded the palletized freight cartons 18 utilizing the warehouse pallets 16 and the pallet jack 14, seeks to ensure that the heavy pallet jack 14 is safely immobilized. The warehouseperson 12 rolls the pallet jack 14 to its assigned location and, using the pallet jack stop handle 24, deposits the pallet jack stop 10 near the pivot wheel(s) 22 of the pallet jack 14. The warehouseperson 12 then rolls the pivot wheel (s) 22 of the pallet jack up the ramped end 26 of the pallet jack stop 10 until the pivot wheels 22 come to rest in the wheel cradle 28 of the pallet jack 14. The warehouseperson 12 may stand with his foot pressing down on the handle 24 while rolling the pivot wheels 22 into the cradle 28 in order to prevent the stop from sliding, although the slots 30 defined in the bottom side of the ramp 26 usually provide sufficient traction that this is unnecessary.

When the pivot wheel(s) 22 of the pallet jack 14 come to rest in the cradle 28 of the pallet jack stop 10, the increased weight causes the rubber or rubber-like material in the slotted areas 30 beneath the ramp 26 to adhere more closely to the warehouse or cargo vehicle's floor 20, further immobilizing the pallet jack stop 10 and pallet jack 14. When it is desired to use the pallet jack 14 again, the operator of the pallet jack 14 disengages pallet jack 14 from the pallet jack stop 10 by lifting the wheeled end 22 of the pallet jack out of the wheel cradle 28 manually.

It will be seen that the pallet jack stop 10 of the present invention provides a convenient, compact, portable, and economical device for temporarily preventing a pallet jack 14 from involuntary rolling when not being used for transporting pallets 16. The rubber or other synthetic, resilient material from which the stop 10 is made is dense enough to provide sufficiently rigid support for the weight of the pallet jack 14, while being lightweight for easy portability, and having sufficient resiliency that the stop will not mar the surface of the floor 20, and having sufficient resiliency that the top surface of the ramp 26 compresses the air pockets within the slots 30 defined in the bottom ramp 26 to improve traction or frictional engagement with the floor 20.

It will be understood that, although the handle 24 is shown as a substantially U-shaped grip through which the warehouseperson 12 may insert his hand, the handle 24 may have any other shape that may be desired, e.g., a solid protrusion with a recess on one or both sides for gripping by the user. It will further be understood that, although the cradle 28 is shown as a substantially rectangular recess having rounded corners, the cradle 28 may be circular, triangular, or any other shape adapted for receiving the pivot wheels 22 of a pallet jack 14, with the height of the sidewalls of the recess and the perimeter of the recess being dimensioned and configured for confining the pivot wheels 22 therein and preventing the pivot wheels 22 from rolling within the cradle 28 or jumping over the sidewalls of the cradle 28.

It is to be understood that the present invention is not limited to the embodiment described above, but encompasses any and all embodiments within the scope of the following claims.

We claim:

1. A pallet jack stop, comprising:
   (a) a body having a top side, a bottom side defining a bottom plane, a ramp end, and a handle end;
   (b) a recess defined in the top side of said body, the recess having a flat bottom and at least one sidewall, the flat bottom having top and bottom surfaces the bottom surface, lying within said bottom plane, the sidewalls being substantially perpendicular to the flat bottom;
   (c) a ramp defined in the ramp end of said body, the ramp sloping away from said cradle, the ramp having a bottom side, there being a plurality of ribs formed in the bottom side of the ramp defining a plurality of slots; and
   (d) a handle extending from the handle end of the body.

2. The pallet jack stop according to claim 1, wherein said body is made from a resilient material.

3. The pallet jack stop according to claim 1, wherein said body is made from dense natural rubber.

4. The pallet jack stop according to claim 1, wherein said body is made from dense synthetic rubber.

5. The pallet jack stop according to claim 1, wherein said body and said handle are made in one piece.

6. The pallet jack stop according to claim 1, wherein said handle is U-shaped grip.

7. The pallet jack stop according to claim 1, wherein said cradle is rectangular in shape.

8. The pallet jack stop according to claim 1, wherein said recess has four sidewalls and a bottom wall defining a substantially rectangular cradle.

9. The pallet jack stop according to claim 1, wherein said body is substantially rectangular in shape.

10. The pallet jack stop according to claim 1, wherein said body and said handle are made from dense rubber and molded in one piece.

11. A pallet jack stop for temporarily preventing rolling movement of a pallet jack, comprising:
    (a) a body having a top side, a bottom side defining a bottom plane, a ramp end, and a handle end;
    (b) a substantially rectangular recess defined in the top side of said body, the recess having a flat bottom and at least one sidewall, the flat bottom having top and bottom surfaces, the bottom surface lying within said bottom plane, the sidewalls being substantially perpendicular to the flat bottom;
    (c) a ramp defined in the ramp end of said body, the ramp sloping away from said cradle, the ramp having a bottom side, there being a plurality of ribs formed in the bottom side of the ramp defining a plurality of slots; and
    (d) a handle extending from the handle end of the body;
       wherein said body and said handle are made from dense rubber; and
       wherein the pivot wheel of the pallet jack is rolled up the ramp and into the cradle in order to prevent the pallet jack from rolling.

* * * * *